United States Patent [19]
Johnson

[11] Patent Number: 4,915,671
[45] Date of Patent: Apr. 10, 1990

[54] VIBRATORY SEED CROP HARVESTING METHOD AND APPARATUS

[75] Inventor: Howard B. Johnson, Woodland, Calif.

[73] Assignee: Johnson Farm Machinery Co., Inc., Woodland, Calif.

[21] Appl. No.: 150,698

[22] Filed: Feb. 1, 1988

[51] Int. Cl.⁴ .............................................. A01F 7/04
[52] U.S. Cl. ...................................... 460/59; 460/76; 56/16.5; 209/283; 209/282
[58] Field of Search ............. 130/224, 25, 27 J, 27 R, 130/30; 56/16.5, 126, 128, DIG. 19, 129, 130; 209/615, 616, 261, 283, 282, 281, 682

[56] References Cited

U.S. PATENT DOCUMENTS

| | | | |
|---|---|---|---|
| 923,324 | 6/1909 | Brost | 130/27 K |
| 2,715,404 | 8/1955 | Tillery | 130/27 K |
| 3,716,060 | 2/1973 | Suzue | 130/27 K |
| 3,959,959 | 6/1976 | Louault et al. | 56/330 |
| 4,232,506 | 11/1980 | Studer | 209/616 |
| 4,335,570 | 6/1982 | Fitzmaurice | 56/13.9 |

FOREIGN PATENT DOCUMENTS

1259976  9/1986  U.S.S.R. ................ 130/25

Primary Examiner—John Weiss
Attorney, Agent, or Firm—Townsend and Townsend

[57] ABSTRACT

An apparatus and method is disclosed for threshing seed crop, such as wheat, barley, rice, corn, beans and many others, by moving the seed crop circumferentially through a trough-shaped screen with openings through which the kernels can pass. A rotatable hub and a multiplicity of tines which project generally radially therefrom are coaxially rotatable relative to the screen. The hub and the tines are rotated so that the free tine ends, which are spaced from the screen, move past the screen at a speed approximately equal to the speed of the apparatus through the seed crop field. The hub and tines are vibrated to superimpose on their rotational movement a multiplicity of cyclical accelerations and decelerations as the seed crop moves from one side of the screen to the other to thereby separate the kernels from the plant growth. A shaker downstream of the screen receives plant growth and loose kernels discharged from the latter and subjects them to further cyclical accelerations and decelerations so that the loose kernels can gravitationally work their way through the plant growth for subsequent collection. The plant growth is biased towards the screen to prevent it from wrapping about the rotating hub.

61 Claims, 4 Drawing Sheets

VIBRATORY SEED CROP HARVESTING METHOD AND APPARATUS

The present invention relates to harvesters for seed crops such as wheat, barley, oats, rice, wild rice, corn, milo, soy beans, sorghum, black-eyed peas, dried beans, safflower, Sudan grass seed, alfalfa seed and others. These and other seed crops have the common characteristic that the crop for each plant comprises a relatively large number of small, lightweight seeds, grains or kernels (hereinafter collectively "kernels") which are attached to relatively bulky plant growths, frequently referred to as straw. To harvest the kernels they must be separated from the plants and the two are than segregated, the kernels being collected for subsequent transportation to points of use while the plants may be left on the field, burned or bundled as fodder or for other uses.

BACKGROUND OF THE INVENTION

Seed crop harvesters, now most commonly used in the form of self-propelled or pull-type combines, incorporate threshers which by and large have not undergone any significant changes for the past hundred years. Briefly, power driven threshers have a rotating cylinder the periphery of which is fitted with axially oriented beater wings, usually provided with peripheral teeth, and a cooperating concave. The concave is trough-shaped and is defined by a multiplicity of axially oriented, parallel bars carried by circumferential supports which are constructed to form relatively large, typically square openings through which loose kernels and an undesirably large amount of chaff gravitationally drop for collection beneath the concave. Threshing is effected by passing the seed crop through a typically adjustable, closely controlled, narrow gap between the beater wings of the cylinder and the rasp bars of the concave. As the seed crop passes through this gap the beater wings and the rasp bars mechanically strip the kernels from the straw.

The bulk of the loose kernels and much chaff drops gravitationally through the openings in the concave. The remaining loose kernels, together with the plant growth or straw, are directed from the concave, usually via a rotatory beater to straw walkers which typically comprise a number of parallel, elongated bars that cyclically move up and down relative to each other to in effect throw the straw into the air. The kernels, which have a greater specific weight than the straw, drop faster than the straw and thus become segregated therefrom so that they can be collected beneath the straw walker.

Since threshers of the type described above mechanically strip the kernels from the straw, the gap or spacing between the rotating cylinder and the concave must be small, otherwise the percentage of the kernels not stripped from the plant and, therefore, not harvested but discharged from the combine with the straw would reach unacceptable levels. Conversely, the gap must necessarily be wider than the size of the kernels, to limit cracking of the kernels. For wheat, for example, a gap width of as little as ⅛ inch and, since the entire, relatively large volume of the crop must be fed through this narrow gap, a cylinder operating at a high relative speed is essential in order to effectively strip the kernels and obtain an adequate throughput so that harvesting of the field can progress at a reasonable speed. This makes it necessary to rotate a standard 22 inch diameter cylinder for threshing wheat, for example, in the range of between 1,000–1,200 rpm, loading to relative surface speeds between the cylinder and the concave of up to 80 mph. This results in very short throughput times for the seed crop, typically in the range of no more than 1/50 to 1/100 sec. or less during which the kernels must be stripped from the plants.

Moreover, it is necessary to evenly distribute the incoming seed crop over the length of the thresher. If, for example, there is a localized bunching of the seed crop in one area of the thresher, the cylinder frequently becomes jammed and threshing comes to a halt. It can only be resumed after a disassembly of the thresher, the removal of the materials jammed therein, and its reassembly, causing down times from ½ hour to several hours during which both the combine and workman operating it are idle. Harvesting costs are correspondingly increased, thereby decreasing the overall efficiency and profitability of the combine.

Even with optimal adjustments of the gap width between the rasp bars of the concave and the beater bars of the cylinder an appreciable portion of the kernels are either cracked, not threshed or both and therefore lost. This reduces the overall quality of the harvested kernels (due to the presence of cracked kernels) and/or lowers the yield, both of which adversely affect the efficiency of the harvesters and the profit that can be obtained with them.

A further drawback of conventional threshers resulting from their above summarized construction and operation is that the components of the thresher, especially the cylinder and the concave, are subjected to large forces and to much wear and tear. This requires a relatively massive construction utilizing high strength materials. Further, it is frequently necessary to specially treat the components and/or use special material to reduce their wear and enhance their operating lives. This makes conventional threshers relatively expensive to build and operate.

As a further consequence of the high-speed force feeding of the seed crop through the narrow gap of the thresher such combines require large power plants which consume large amounts of expensive fuel. Much of this power is lost due to friction between the cylinder, the straw and the concave and for stripping, i.e., tearing the kernels from the straw. Harvesting costs are thereby further increased.

In spite of the many shortcomings of conventional threshers, only the most important of which have been mentioned above, they have undergone no significant changes over the last 100 years. They are used today in even the most technologically advanced and efficient combines, thousands of which are in operation throughout the U.S. and worldwide. Yet, the best that can be achieved with such combines is an attempt to strike an optimal balance among two highly undesirable side effects which are necessarily encountered with such threshers, namely kernel cracking and kernel loss due to nonthreshing.

SUMMARY OF THE INVENTION

The present invention approaches the task of threshing seed crops in a fundamentally different manner. Instead of attempting to strip the kernels from the straw by passing the seed crop at a high speed through a narrow gap (between prior art cylinders and concaves) the crop is threshed by moving it at a leisurely pace and subjecting it to vibrations, i.e., to a large number of cyclical accelerations and decelerations. The vibrations separate the kernels from the plant growth by taking advantage of inertial forces between them which pull the two apart without the need for physically contacting them and stripping one from the other.

This has the distinct advantage that there is no need to force the seed crop through narrow passage ways or gaps at high rates of speed. The components of the thresher of the present invention need not be subjected to large forces, high relative speeds and significant frictional wear and tear as is true for conventional threshers. Thus, harvesting in accordance with the present invention can be accomplished with lighter, less costly equipment requiring much less maintenance and power to operate. As a result thereof, harvesting is rendered more efficient as compared to the past, thereby enhancing profits for the farmer.

The present invention accomplishes this by providing a screen, preferably a concave or trough shaped screen of a generally semi-cylindrical shape, over which the seed crop travels transversely to the axis of the screen from an upstream to a downstream side thereof. For purposes of this disclosure and the claims, the term "semi-cylindrical" is not meant to and does not mean that the screen extends over any particular arc. Instead, it means that the screen extends over less than 360° and has the approximate shape of a partial cylinder about an axis which extends longitudinally over the length of the screen.

A hub fitted with a multiplicity of elongated tines, the free ends of which are spaced from the screen, rotates coaxially with the screen at a leisurely speed, typically at a speed which is on the order of or roughly equal to the speed of the combine through the seed crop field. The separation of the kernels from the plant growth is effected by subjecting the tines to vibrations, that is to a relatively large number of cyclical accelerations and decelerations of a sufficient frequency and magnitude so that the inertial forces acting on the kernels and the plant growth cause their separation. Separated kernels drop through small, e.g., $\frac{3}{4}$ inch $\times$ $\frac{3}{8}$ inch apertures in the screen. Such a small aperture size, made possible because the screen can be manufactured from perforated plate because it is not subjected to the same large forces as prior art concaves, greatly reduces the amount of chaff that drops through the screen. This in turn facilitates the cleaning of the grain because chaff is relatively difficult to separate from the kernels.

To the extent that kernels remain embedded in the mass of plant growth discharged from the downstream side of the screen, they are segregated in a shaker which may be of conventional construction, e.g. a straw walker, or which may be a second vibrational shaker constructed in accordance with the present invention as is further described below.

In terms of operating parameters, in a preferred embodiment of the present invention the tines define a generally cylindrical brush having a diameter of about 42 inches. It normally rotates at a rate in the range of about 4–30 rpm, resulting in a peripheral speed of the tines in the range of between about 0.75–4 mph, which corresponds to typical, expected ground speeds for the combine of roughly 0.75 to 4 mph. Since there is no need to physically strip kernels from the plant growth, spacings between relatively movable parts of the rotary brush and the trough-shaped screen can be large to prevent kernel cracking. In a preferred embodiment of the invention, for example, the spacing between the screen and the free tine ends is about $\frac{1}{4}$ inch for such small kernels as wheat or rice, for example. This spacing can be significantly increased for larger kernel crops such as dry beans, soy beans or corn or reduced to about $\frac{1}{8}$ inch, especially for crops with small seeds.

To subject the kernels to sufficient inertial forces in order to separate them from the plant growth, the rotary brush is vibrated at rates which typically range from about 300 cpm to as high as 3,000 cpm, depending upon the crop and its condition. Thus, for wheat the vibrations typically have a frequency in the range between 1,000 to 1,500, for semi-dry rice, that is rice with a kernel moisture content of no more than about 22%, the vibration frequency preferably lies in the vicinity of 1,500, whereas for larger kernel crops, such as dried beans, for example, the vibration frequency will normally be in the range of about 500 to 700 cpm.

To effect sufficient acceleration and deceleration forces, the vibration stroke or amplitude is preferably selected so that the free tine ends momentarily reverse their direction of movement as they rotate in an overall downstream or forward direction. For example, in a presently preferred embodiment employing a 42 inch diameter breach the free tine ends move during each vibration cycle 2 inches backwards for each 4 inches forward, i.e., their forward travel is approximately twice their reverse travel during each cycle. This is achieved as follows: the drum is vibrated at 1,500 cpm, employing two 200 lb. eccentric weights. This causes the tines to move about 3 inches backwards and 4 inches forward. Additional forward motion is obtained from the 12 rpm rotation of the drum so that the effective tine movement during each cycle becomes 2 inches backward and 4 inches forward, resulting in a momentary maximum tine end speed during each cycle of only about 15 mph with, of course, a much lower average speed of only about 1½ mph. Both the maximum and average speeds of the tine ends are only a fraction of the relative speed of conventional threshing cylinders which significantly reduces kernel cracking and wear and tear of the thresher.

Threshing is enhanced, that is, a more complete separation of the kernels from the plant growth is obtained by yieldingly resisting the downstream movement of the plants and kernels as they travel over the trough-shaped screen. This is achieved in accordance with the present invention by, for example, mounting a multiplicity of raised blocks or islands to the screen. The islands extend generally radially towards the tine mounting hub a distance which is greater than the spacing between the free tine ends and the screen. The islands are elongated, with their long sides generally parallel to the direction of rotation of the hub and the tines, and they are spaced apart in both the axial and circumferential directions of the screen so that unobstructed paths are provided between opposing island sides along which the free tine ends can move from the upstream to the downstream side of the screen. The circumferential spacing of the islands forms raised (above the screen) surfaces which face the seed crop as it moves in a downstream direction, thereby impeding or yieldingly resisting the movement of the crop over the screen. As a result thereof, the acceleration/deceleration caused by the vibrating tines is enhanced, generating greater inertial forces and facilitating the separation of the kernels from the plant growth.

The present invention further contemplates to bias the seed crop towards the screen, preferably by providing elongated straps constructed of a resilient material which springly urge the crop against the screen. Plant growth is thereby prevented from wrapping about the rotating hub. Further, the crop is retained at the radially outer end of the tines where acceleration/deceleration forces resulting from the tine vibrations are greatest and, therefore, most effective in separating the kernels from the plant growth.

As mentioned earlier, plant growth and loose kernels entangled therein which are discharged from the thresher are received by a conventional shaking mechanism such as a straw walker or a vibrational shaker constructed in accordance with the present invention. Such a vibrational shaker also has a trough-shaped screen onto which the plant growth including loose kernels are deposited. A hub including generally radially projecting, elongated tines is rotated so that the plant and kernels are moved across the second screen in a downstream direction at about the same speed as they move through the thresher. Superimposed onto the rotational movement are vibrations to accelerate/decelerate the tines, and therewith the plant growth and loose kernels. This shaking action permits the kernels to work their way in a downward direction through the mass of plant growth until they reach the screen where they pass through openings for subsequent collection.

A shaker constructed and operating as summarized in the preceding paragraph is highly efficient and compact. In the past, shakers in the form of straw walkers, often were 12 feet in length and more. In contrast, the shaker of the present is typically no more than about 60 inches in diameter. Thus, it takes up no more than about half the length of prior art shakers.

The shaker is further more efficient than prior art straw walkers which separate loose kernels from straw by attempting to throw both upwardly into the air, often by as much as 1½ feet or more, and then awaiting the reversal of the upward momentum of the kernels to drop gravitationally downward past additional upwardly thrown straw and kernels. The bulkiness of such straw walkers and the substantial throw that is required of them lead to relatively large power consumptions.

The shaker of the present invention merely vibrates the plant growth, including loose kernels, in a predominantly horizontal direction, that is without any attempt to throw either the plant growth or the kernels upwardly. The vibrational movements enable loose kernels to work their way downwardly through the plant mass until they reach the screen for discharge therefrom. The slow, vibrational forward rotation of the shaker hub, including the tines attached thereto, requires relatively little power. In addition, since the plant growth is by and large maintained as a coherent mass, much less dust and chaff is generated.

Thus, the present invention provides a seed crop thresher, typically incorporated in a self-propelled combine, which, as compared to conventional combines, enhances the yield of kernels, reduces the percentage of cracked kernels to practically zero, and does this with much less power than was required for a prior art combine of comparable capacity. A combine constructed in accordance with the present invention is much more compact and of a substantially shorter length than comparable prior art combine so that their overall size and weight can be reduced. This results in further cost reductions for both the initial manufacture of a combine and its subsequent use. Accordingly, significantly higher profits can be attained with the combine of the present invention.

DESCRIPTION OF THE PREFERRED EMBODIMENTS

Figure 1:
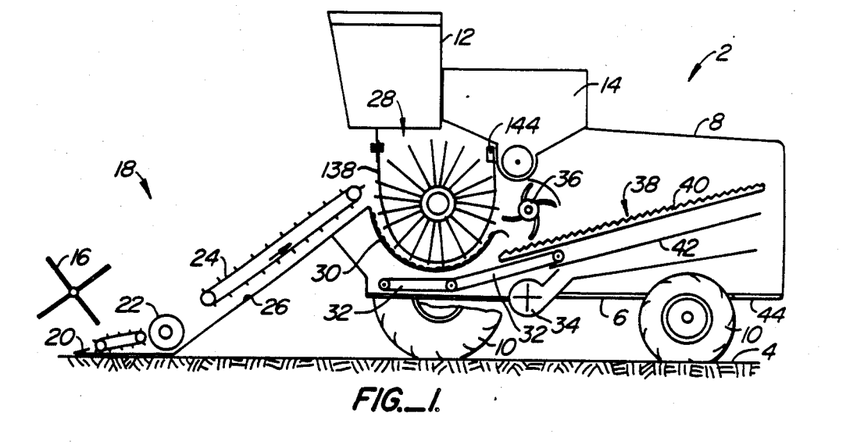
FIG. 1 is a schematic, fragmentary, side elevational view, with sections broken away, illustrating a grain combine constructed in accordance with the present invention.

Referring first to FIG. 1, a combine 2 constructed in accordance with the present invention for harvesting a seed crop having kernels carried by plant growth on a ground 4 generally comprises a frame 6, which includes an enclosure or housing 8 and which is carried by wheel sets 10 for moving the combine over the ground. At least one of the wheel sets is steerable, as is conventional, and at least one of the sets is driven by an engine (not separately shown) mounted to the frame within housing 8. As is conventional, the frame also carries a cab 12 for an operator and a grain storage bin 14 for receiving harvested grain and holding it for intermittent transfer to a container or vehicle (not shown).

A conventional reel 16 mounted at a forward end 18 of the combine holds the crop against a cutter bar 20 which cuts the plant growth. The reel pushes the cut plant growth, including kernels carried thereby, into the path of an auger 22 which moves the cut crop towards the center of the combine where it is engaged by a feeder conveyor 24 that overlies an inclined slide 26 and moves the cut crop upwardly into a thresher 28 constructed as described in detail below. Kernels separated from the plant growth in the thresher drop through a trough-shaped screen 30 downwardly onto a grain conveyor 32 which feeds the kernels, including any chaff that fell through the small screen holes onto a cleaning shoe 42. A blower 34 blows air through the cleaning shoe from underneath to blow off chaff and the kernels, less chaff, are then carried by a transversely oriented grain auger (not shown) to vertical augers (not shown) which deliver it to storage bin 14.

Threshed plant growth, including loose kernels suspended therein, is discharged from the screen 30 via a rotary beater 36 onto a straw walker 38 (only schematically illustrated). As is conventional, the straw walker comprises a plurality of parallel, spaced apart, elongated and upwardly inclined grates 40. A crank mechanism (not shown) oscillates the bar up and down and thereby throws the plant growth, including the loose kernels, high up into the air and in a rearward direction. Aided by a blower (not separately shown) the relatively light straw is thereby carried rearwardly past the ends of the bar and is permitted to drop downwardly through an opening 44 in the frame onto the ground. The relatively heavy (high specific weight) kernels drop down through the grates 40 of the straw walker onto the inclined cleaning shoe 42 and are then also directed to the transverse grain auger (not separately shown).

As so far described, the construction of the combine is entirely conventional. Especially the straw walker section of the combine includes an air flow cleaning system, chaffer sections, etc., which are not further described or shown in the drawings because they do not form part of the present invention. The detailed construction of this aspect of the combine can be ascertained, for example, from an inspection of grain and sorghum combines constructed by and available from John Deere & Co. of Moline, IL. The construction is also described in numerous publications available from the same source.

Referring now to FIGS. 1-5, a central aspect of the present invention is the construction and operation of the thresher 18. It is defined by the earlier mentioned, trough-shaped screen 30 which will normally be oriented transversely to the travel direction of the combine and which cooperates with a vibratory drum, brush or rotor 46 mounted to frame 6 and defined by a hub 48 from which a multiplicity of elongated tines 50 project. The tines extend generally radially outward from the hub and terminate in free ends 52 which are spaced from the screen 30 a sufficient distance to prevent the crushing or cracking of kernels between the free tine ends and the opposing screen surface, e.g. at least about ¼ inch for small size grains such as wheat or rice.

Figure 2:
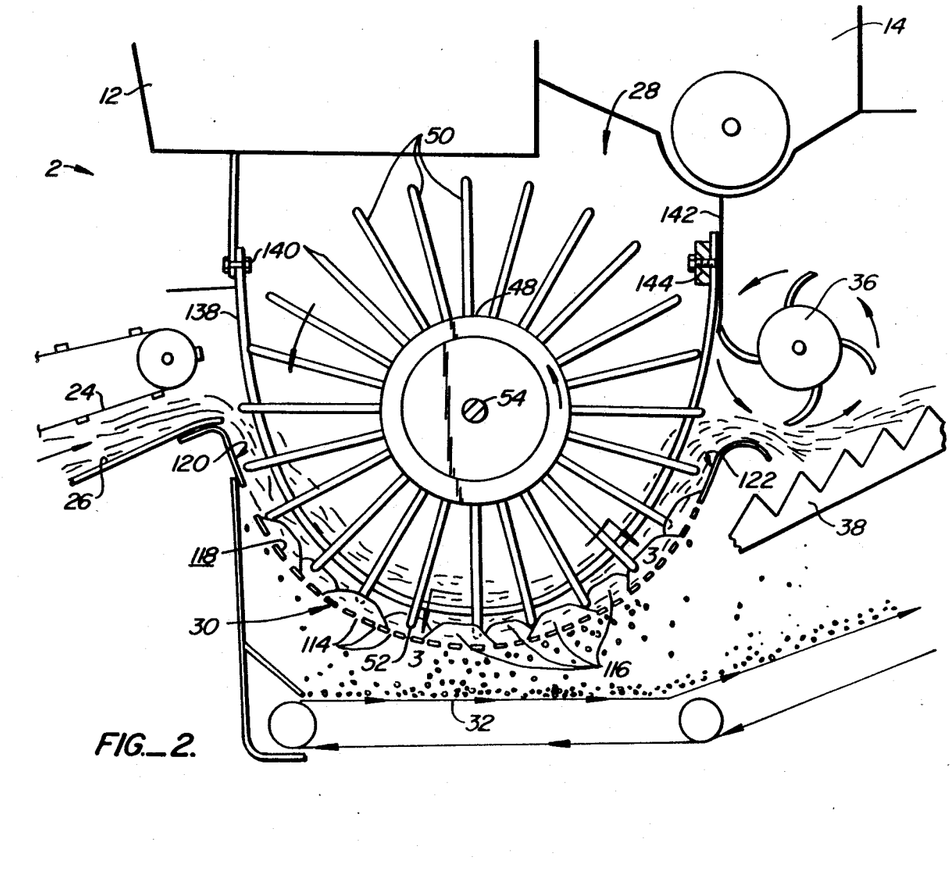
FIG. 2 is an enlarged, fragmentary, side elevational view, partially in section, through a vibratory shaker for a thresher constructed in accordance with the present invention and used in the combine illustrated in FIG. 1.
Figure 5:
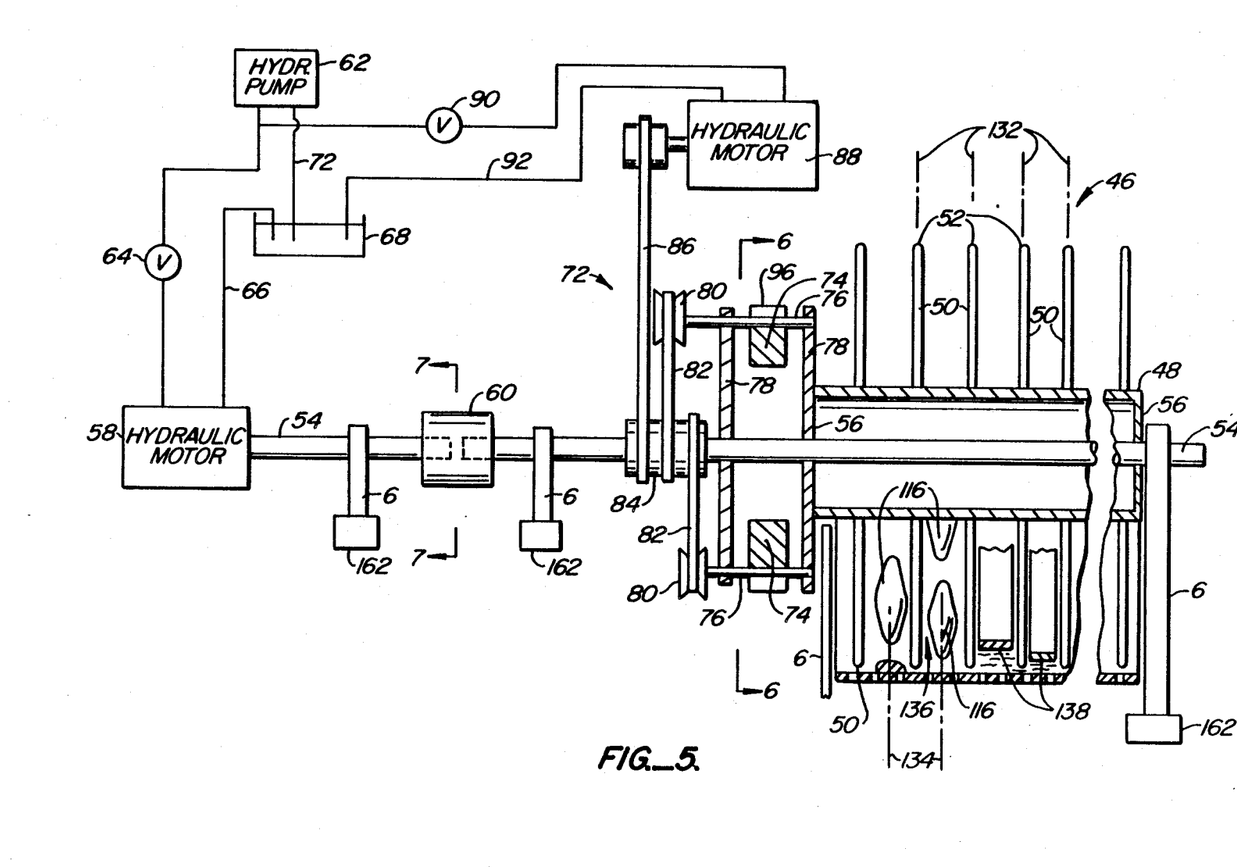
FIG. 5 is a schematic, fragmentary, side elevational view, partially in section, and illustrates the vibratory drive mechanism for the thresher shown in FIG. 2.

In one embodiment of the present invention, best illustrated in FIGS. 2 and 5, the tines 50 are relatively stiff, elongated, typically ½ inch to ⅜ inch diameter fiber-reinforced resin rods which are suitably attached to the cylindrical hub by bolting or clamping it thereto (not separately shown). The hub is secured to an elongated shaft 54 which is rotatably mounted to frame 6 (only schematically illustrated in FIG. 5) with end plates 56 so that the hub, and therewith the tines, rotate with the shaft. A first hydraulic motor 58 drives shaft 54 via a coupling 60. A hydraulic pump 62 delivers pressurized hydraulic fluid via a flow regulating valve 64 to the hydraulic motor so that the motor speed can be adjusted as if further described below. Spent hydraulic fluid is returned via a return line 66 to a reservoir 68 from which the pump draws fresh fluid via an intake line 70.

Vibrational movements, that is cyclical accelerations and decelerations are superimposed onto the hub and tines 48, 50 rotated by hydraulic motor 58 with a vibratory drive 72. In one embodiment of the invention, the vibratory drive is formed by two counterweights 74 secured to and rotating with corresponding shafts 76 journaled in and extending between two spaced apart support bars 78, one of which may be attached to or form part of hub end plate 56 and both rotating with the hub and hub shaft 54. The counterweight shafts 76 are driven by corresponding pulleys 80 and two V-belts 82 which, at their other ends, engage a drive sleeve 84 journaled on shaft 54. The sleeve in turn is driven via a V-belt 86 by a second hydraulic motor 88 which receives pressurized hydraulic fluid via a control valve 90 from hydraulic pump 62. A return line 92 is provided for flowing spent hydraulic fluid from motor 88 back to reservoir 68.

The operation hydraulic pump 62 is energized so that hydraulic fluid flows from the pump to both hydraulic motors 58, 88 via respective flow control valves 64, 90. Motor 58 drives shaft 54 and rotates hub 48, including tines 50 projecting therefrom, and the support bars 78.

Second motor 88 rotates counterweights 74 via belt 86, drive sleeve 84, belts 82, pulley 80 and shafts 76 which mount the last mentioned pulley as well as the counterweights. Preferably, the motor is driven so that the counterweights rotate in the opposite direction from the hub.

Figures 6, 7, 8, 9:
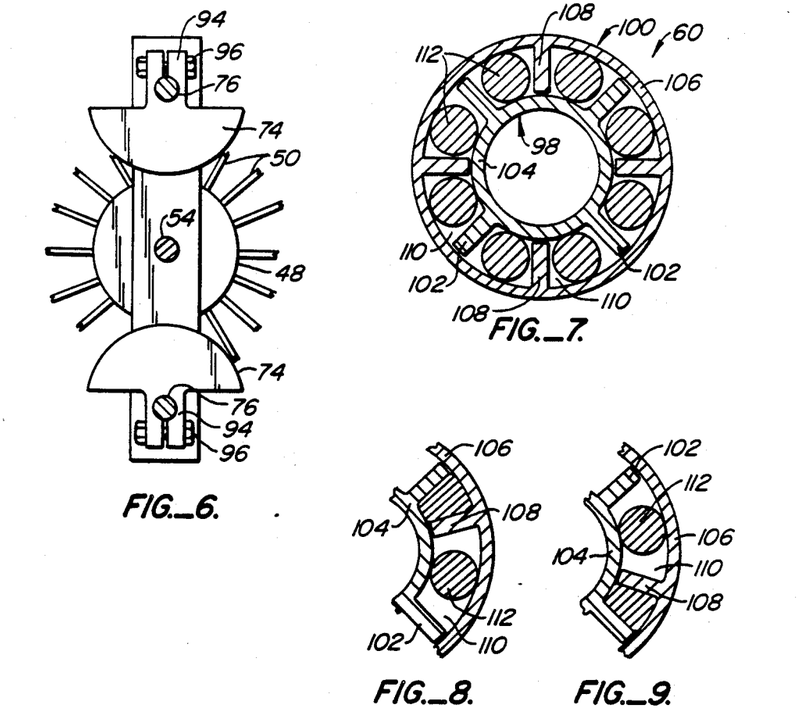
FIG. 6 is a fragmentary, side elevational view, in section and is taken on line 6—6 of FIG. 5.
FIG. 7 is a side elevational view, in section, illustrating a preferred clutch utilized in the drive mechanism of the present invention and is taken on line 7—7 of FIG. 6.
FIGS. 8 and 9 are fragmentary, side elevational views, in section, and illustrate alternative, operational positions of the clutch illustrated in FIG. 7.

In a presently preferred embodiment of the invention each counterweight includes a split mounting flange with an aperture dimensioned so that the flange can be slipped over shaft 76. A schematically illustrated bolt 96 is provided for locking each weight to the shaft. The weights are positioned on the respective shafts so that they are 180° out of phase as is illustrated in FIG. 7.

The rotation of the counterweights mounted to support bars 78 superimposes onto the constant rotation of the drum driven by hydraulic motor 58 a vibratory or oscillating motion which cyclically accelerates and decelerates the angular velocity (speed) of the drum. The frequency of rotations is a function of the speed with which the counterweights are driven, each complete revolution of the weights causing a complete acceleration/deceleration cycle in the angular velocity of the drum. The amplitude of the acceleration/deceleration is a function of the mass of the counterweights, the greater the mass the greater the amplitude for a given vibratory mass, that is, for a given mass of hub 48, including tines 50 and any seed crop that is engaged by the tines.

Depending on the speed of the hub the vibratory oscillations cyclically accelerate and decelerate the hub as it rotates in a "downstream" direction. By appropriate selection of the drum speed and the mass of the counterweights one can select, for example, to cause a momentary reversal of the direction of movement of the drum during each vibration cycle. Optimal conditions can thereby be created in the vibratory thresher of the present invention to assure that the inertial forces acting on the kernels of the seed crop are of sufficient magnitude, frequency and duration during the relatively long residency of the crop on the screen, typically between about ½ to 2 or more seconds as compared to no more than 1/50 to 1/100 second in conventional threshes, to effect their separation from the plant growth.

Referring now to FIGS. 5 and 7-9, clutch 60 protects hydraulic motor 58 against damage from the vibrations of drum 46. The clutch has concentric inner and outer clutch halves 98, 100 which are keyed to and rotate with a first section of shaft 54 which is driven by motor 58 and a second independent section of the shaft which mounts drum 46 and is driven by the motor via the clutch.

The inner clutch half includes a plurality, say four equally spaced flanges 102 which project radially outwardly from a hub 104 keyed to one of the two sections of shaft 54. The outer clutch half is defined by a coaxial housing 106 which is suitably keyed (not shown) to the other one of the two shaft sections and it includes a like number of equally spaced flanges 108 which project radially inwardly from the housing towards the hub and are normally positioned midway between the outwardly extending flanges 102. The interleafed flanges 102, 108 define axially oriented, sector-shaped spaces 110 each of which receives a cylindrical bar 112 constructed of an elastomeric, that is a resiliently deformable material such as rubber, for example. The cylindrical bars typically have a diameter slightly less than the radial spacing between hub 104 and housing 106 and less than the arc between opposing surfaces of adjacent flanges 102, 108.

During normal, downstream rotation of drum 46 the two drum halves move angularly relative to each other and thereby compress every second elastomeric cylindrical bar 112 as is shown, for example, in FIG. 8. During an acceleration/deceleration cycle the direction of drum rotation may momentarily reverse so that the two clutch halves move angularly with respect to each other in the opposite direction. This allows the previously compressed bars 112 to relax and return to their cylindrical state while the previously relaxed bars because compressed as is illustrated in FIG. 9. Thus, clutch 60 permits an appreciable amount of relative angular motions between the drum 46 and its drive motor 48 and thereby significantly cushions the impact of motion reversals caused by vibratory drive 72 to protect the motor from damage which hard motion reversals can cause.

Other vibratory drives can of course be substituted for the one described above. For example, U.S. Pat. No. 4,232,506, for a tomato harvester which employs a rotating and oscillating shaker describes in some detail a hydraulic vibratory drive which can be substituted for the one described above. Those skilled in the art are in a position to devise still other vibratory drives which can be used on the thresher of the present invention. They are, therefore, not further described herein.

Referring now to FIGS. 2 and 5, screen 30 which forms part of thresher 28 of the present invention has a trough-shaped, generally semi-cylindrical configuration (although it typically extends over an arc of less than 180° and, therefore, has a circumferential extent less than a semi-cylinder) and is suitably mounted (not separately shown) to frame 6 of the combine. Its axial ends are open and it is disposed between vertical end walls which are only schematically illustrated in FIG. 5 and form part of, or are secured to, frame 6 of the combine. The screen includes a multiplicity of perforations 114 evenly distributed over the full area of the screen and of a sufficient size to permit kernels of the crop to pass therethrough. For example, for harvesting most grains such as wheat, barley or rice the perforations are oblong holes having a length (in a downstream direction) of $\frac{3}{4}$ inch and a width of $\frac{3}{8}$ inch. For other seed crops, such as beans, which are relatively larger the perforations may be dimensioned 1 inch $\times$ 9/16 inch or larger.

Figure 3:
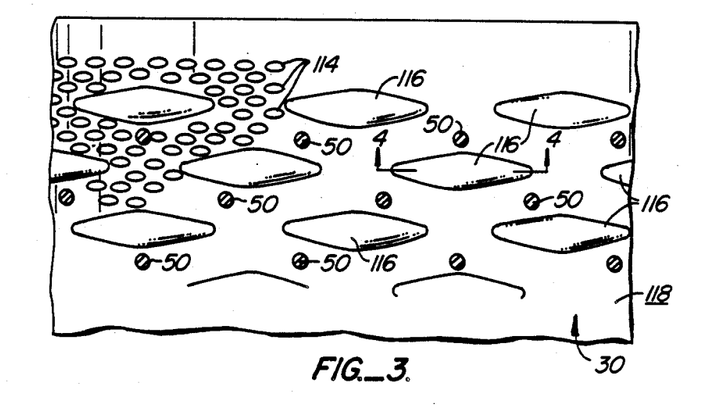
FIG. 3 is an enlarged, fragmentary plan view taken on line 3—3 of FIG. 2 and illustrate a portion of the trough-shaped screen which forms part of the thresher of the present invention.
Figure 4:
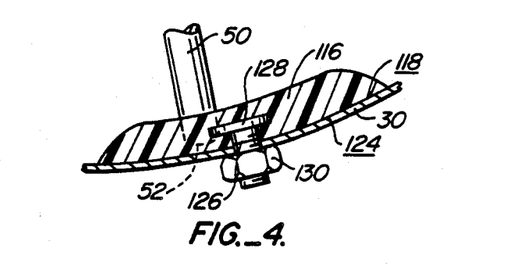
FIG. 4 is an enlarged, fragmentary, side elevational view taken along line 4—4 of FIG. 3 and illustrates the construction of inwardly raised islands replaceably attached to the screen illustrated in FIGS. 2 and 3.

The screen further includes a relatively large number of raised islands 116 secured to the concave inside surface 118 of the screen and projecting in a generally radial direction radially inwardly towards hub 48. Each island is elongated in the direction of the hub rotation, has a diamond-shape and a height, in the radial direction, which is substantially, i.e., at least about two times greater than the radial spacing between free tine ends 52 and the concave inside of the screen. In a presently preferred embodiment, in which drum 46 has a diameter of about 42 inches, each island is about 6 inches in length, has a maximum width of about 1½ inches at its center and a height of about 1¼ inches (while the tine ends are spaced from the screen about ¼ inch). The exposed edges of the island, including its pointed ends are rounded as is best illustrated in FIGS. 2–4 so that the island resiliently resists the movement of the seed crop from an upstream side 120 of the screen to the downstream side 122 thereof without interfering with the movement of the crop.

For the purposes of this disclosure and the claims, the term "yieldingly resist" means that the islands increase the resistance of the seed crop to being moved over the screen without preventing such movement. The islands thereby enhance the effectiveness of the thresher of the present invention by making it easier for vibratory drum 46 to separate the kernels from the plant growth.

Preferably, the islands are constructed of a wear and impact resistant material, such as ultra-high molecular weight polyethylene for example. They are molded so that their undersides 124 conform to the curvature of the screen and they are demountably attached to the screen so that worn islands, for example are readily replaced. For this purpose each island is fitted with a bolt 126 having a head 128 embedded, i.e., molded into the island. The bolt extends through appropriately sized and positioned apertures in the screen and it is secured to the screen with a threaded nut 130.

To assure the passage of tines 50 past raised islands 116 without interference the tines are arranged in multiple radial planes 132. The planes are spaced apart a sufficient distance so that the islands 116 can be arranged on screen 30 in correspondingly spaced but offset rows 131. The tine plane/island row spacing is selected so that there remains an unobstructed path 136 which extends circumferentially from the upstream side 120 of the screen to the downstream end 122 along which the free tine ends 52 can freely move. It is preferred that the unobstructed path for the tines has a width equal to their diameter (or other transverse dimension) plus at least about a ⅛ inch and preferably a ¼ inch clearance on each side, e.g. so that the path width is at least about ¼ inch and preferably ½ inch larger than the tine diameter. Thus, for a ½ inch diameter tine the path width is at least about ⅞ inch and, preferably about one inch (providing a nominal ¼ inch clearance on each side of the tine). With a one inch path width and islands having a 1½ inch width the spacing between the tine plane/island rows becomes approximately 2½ inches, a spacing which appears close to optimal. The islands in adjacent rows are further staggered (best seen in FIG. 3) so that the tines can resiliently deflect away from an island in the event an obstruction becomes lodged in a row. This avoids a jamming of drum 46, damage to the tines and/or kernel cracking.

Referring now to FIGS. 1, 2 and 5 thresher 28 includes a plurality of generally circumferentially extending, axially spaced seed crop hold down straps 138. Their purpose is to bias the seed crop moving over screen 30 towards the screen and to prevent plant growth from wrapping about the rotating hub 48. Each hold down strap is defined by an elongate, flexible bar, for example of a rectangular cross section (½ inch×1 inch) and is constructed of a flexibly deformable material such as ultra-high molecular weight polyethelene, for example, to limit the wear of the bar during use. The width of the strap is about equal to the width of the islands 116 to prevent the formation of substantial gaps between the edges and the rotating lines past which plant growth could rise upwardly and wrap about the rotating hub.

One end of the bar is bolted to combine frame 6 with a bolt 140. The strap depends downwardly from the bolt, rests against screen 30, islands 116 and/or seed crop thereon and in one embodiment of the invention employing a 42 inch diameter drum 46, it typically has a length of between about 6–7 feet. The other end of the strap remains free and by virtue of the bar's flexibility rests against an upright wall 142 of the combine (which in turn is carried by frame 6). The free strap end is fitted with a weight 144, for a strap having the above recited dimensions weighing approximately 2–3 pounds, which, together with the weight of the bar, urges the bar downwardly towards the seed crop on screen 30. A hold down strap 138 can be placed in each island row 134 although, more typically, a hold down strap is required only at some of the island rows, e.g. at each third or fourth row.

Aside from biasing the seed crop towards the screen, and thereby towards the radially outmost portion of the tines where they are most effective for separating the kernels from the plant growth, the hold down straps permit the passage of bunched plant growth which frequently jammed and stalled prior art threshers. Such bunched plant growth can pass through thresher 28 of the present invention because there is sufficient space between the screen and hub 48. When bunched seed crop enters the thresher the crop simply pushes the hold down strap in general and its free end in particular upward so that it can pass through the thresher. When normal crop thickness is again reached the hold down strap, aided by weight 144, moves again downwardly to return to its normal position (illustrated in FIG. 2).

Referring to FIGS. 1–6, a combine 2 incorporating a thresher 28 constructed in accordance with the present invention operates as follows. The combine is driven through the field at a given speed, say 1½–2 mph, and cuts the seed crop, wheat for example, conventionally above the ground and below the seed pods. Feeder conveyor 24 elevates the crop so that it enters the thresher at the upstream side 120 of screen 30 as a layer of plant growth and kernels carried thereby which is usually of a relatively uniform thickness. Hydraulic motor 58 is energized and set so that the peripheral speed of drum 46 (at tine ends 52) is approximately equal to the ground speed of the combine. The second hydraulic motor 88 is activated and operated so that cyclical accelerations and decelerations are imposed over the rotational movement of the drum. The frequency of the acceleration/deceleration cycles, or of the drum "vibrations", is adjusted to suit the particular crop being harvested. It will normally be in the range of between about 300–3,000 cycles per minute and, most typically it would be in the range of between 500 to 1,500 cycles per minute. The higher frequencies between about 1,200–1,500 cycles per minute are normally for crops having relatively small kernels, such as wheat, sorghum or rice, for example. The lower frequencies are used for larger kernels such as, for example, dried beans. Thus, especially as contrasted with conventional threshers, the seed crop moves over the screen at a relatively leisurely pace. It takes at least about 1 second and typically about 2 to 2½ seconds for the crop to move from the upstream side 120 to the downstream side 122 of the screen. Depending on the setting of the second hydraulic motor 88 the crop will be subjected to at least about 20 and normally to about 40 or more acceleration/deceleration cycles while it is on the screen. During this time interval the crop receives from about 40 to 80 or more vibrational hits. Each such hit subjects the crop to relatively large inertial forces which tend to pull or separate the kernels from the plant growth.

To protect the combine as a whole from the vibrations drum 46 and screen 30 shock absorbers 162 (shown schematically in FIG. 5) are interposed between them and the rear portion of frame 6 and housing 8.

The crop layer entering the thresher is grasped by tines 50 and advanced over the screen from the upstream side 120 to the downstream side 122 thereof at approximately the same speed with which the combine moves through the field. Thus, the crop is neither bunched nor thinned out while in the thresher.

As the crop is moved over the screen the cyclical accelerations/decelerations of the tines are imparted to it. The kernels carried by the plant growth are thereby subjected to inertial forces during the periods of highest acceleration or deceleration which effectively pull apart the kernels and the plant growth because of their differing specific weights without physically touching or stripping them. Hence, there is no need for narrow gaps between moving parts such as the tines 50, the screen 30 and the islands 116, through which the crop must be fed. Instead, ample clearance can be left between them which permits the relatively unobstructed passage of the kernels past them. A major source of kernel cracking experienced with prior art threshers is thereby eliminated.

The islands 116 enhance the threshing action in thresher 28 of the present invention in several ways. For one, they yieldingly resist the downstream motions of the crop so that, aside from the kernel separation by means of the earlier discussed inertial forces different portions of the crop mass on the screen move at slightly differing instantaneous speeds. This both enhances kernel separation and further induces relative movements between portions of the crop mass, which permits already separated kernels to gravitationally work their way downwardly towards screen 30. Once the kernels arrive at the screen they drop through screen perforations 114. Kernels which drop through the screen are collected on conveyor 32. These kernels are then deposited on cleaning shoe 42 and conventionally transported (via customary horizontal augers and vertical screw elevators, not shown) into grain bin 14.

Seed crop which arrives at downstream end 122 of the screen comprises essentially only plant growth and some loose kernels; virtually all kernels have been separated from the plant growth in the thresher. The rotary beater 36 grasps the crop as it is discharged from the thresher and propels it in a downstream direction onto straw walker 38. There the loose kernels, which are entrained or entangled in the plant growth mass, are disengaged from the plant growth and permitted to drop free of the plant growth and past the straw walker for conventional collection beneath it. Any loose kernels remaining in the plant growth mass are thrown up into the air by the straw walker, as is conventional, and also collected beneath it. The plant growth continues in a downstream direction over the length of the straw walker and is eventually discharged through opening 44 in the housing onto the ground.

Figure 10:
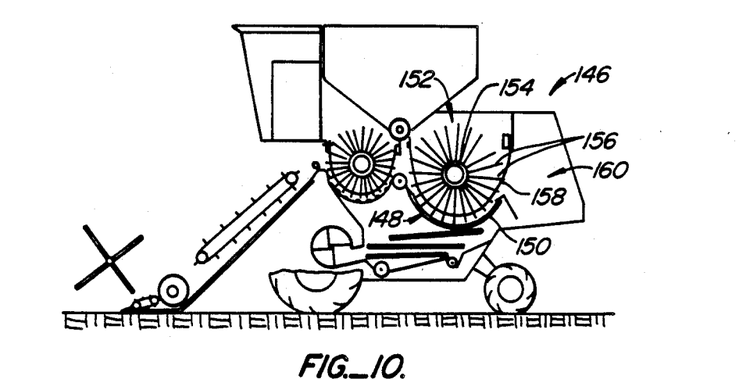
FIG. 10 is a schematic, fragmentary, side elevational view similar to FIG. 1 and illustrates another embodiment of the present invention employing a rotary, vibratory shaker downstream of the thresher.

Referring now briefly to FIG. 10, another combine 146 constructed in accordance with the present invention is identical to combine 1 shown in FIGS. 1 and 2, for example, except that it does not include a straw walker. The function of the straw walker is performed by a shaker unit 148 which comprises a troughshaped screen 150 and a cooperating drum 152 formed by a hub 154 and tines 156 which radially project therefrom. A constant speed rotary drive and a vibratory drive, rotate the drum and subject it to cyclical accelerations/decelerations. These drives can be constructed substantially like the drives disclosed in conjunction with the description of thresher 28.

Shaker unit 148 also includes hold down straps 158 which are constructed and which function like hold down straps 138 of thresher 28. However, the shaker typically does not include raised islands as are present on the thresher unless the seed crop in question is difficult to harvest. In that event, the inclusion of islands can help separate from the plant growth any kernels which were not separated in thresher 28. Typically, the diameter of shaker drum 152 will be somewhat larger than the diameter of thresher drum 46, e.g. for a 42 inch diameter thresher drum the shaker drum diameter (at the free tine ends) will be in the vicinity of 60 inches.

In operation, threshed seed crop discharged at the downstream end 122 of the thresher is fed to the intake side of shaker 148. Drum 152 moves the plant growth, including loose kernels entrained therein in a downstream direction towards shaker discharge side 160. During this movement the plant growth mass is subjected to cyclical accelerations and decelerations which permit the kernels to gravitationally work their way through it until they reach screen 150, where they drop through the appropriate perforations (not separately shown in FIG. 10) for collection beneath the shaker in a conventional manner. The plant growth discharged from shaker unit 148 is virtually free of loose kernels. Since the thresher separates almost all kernels from the plant growth, there is little if any kernel loss which, of course, significantly enhances the efficiency of the combine.

The shaker unit 148 of the present invention has several distinct advantages over conventional straw walkers. For one, it is of a much lesser length. For example, the longitudinal (in the direction of combine travel) dimension of the shaker is only about 60 inches whereas straw walkers of comparable capacity and effectiveness have a length of as much as 12 feet or more. This results in a significant reduction of the overall length of the combine, its weight and, therefore, both its initial costs and its operating costs.

Further, the plant growth and loose kernels travel from the upstream to the downstream sides of the shaker along a path which is primarily horizontal, i.e., which only has relatively slight sloping sides in the vicinity of the ends of the screen. Thus, the cyclical accelerations and decelerations to which the plant growth is subjected causes relative movement of the kernel in a primarily horizontal plane so that each time the plant mass presents an opening of a sufficient size for the kernel to pass it does pass. As compared with straw walkers, this is a much more effective way of shaking loose kernels out of the plant mass. The former throw the kernels high up into the air to effect a sufficient separation between the kernels and the plant growth and to enable the kernels to drop gravitationally downwardly. The time and space required to effect separation in this manner and the energy that must be expended to achieve it are much greater when straw walkers rather than the shaker unit of the present invention are employed.

What is claimed is:

1. A method for harvesting a seed crop having kernels carried by plant growth, the method comprising the steps of moving the crop along a surface in a predetermined direction; during the moving step subjecting the crop to cyclical accelerations and decelerations substantially parallel to said direction and of a sufficient frequency and amplitude to separate the kernels from the plant growth; and segregating the kernels from the plant growth.

2. A method according to claim 1 wherein the surface is part of a seed crop harvesting combine adapted to travel about a seed crop field, and wherein the step of moving comprises the step of moving the crop at about the same speed as the speed with which the combine travels about the field.

3. A method according to claim 1 wherein the step of subjecting comprises the step of accelerating and decelerating the crop at a frequency in the range of between about 300 to about 3,000 cycles per minute.

4. A method according to claim 3 wherein the step of subjecting comprises the step of selecting a frequency in the range of between about 500 to 1500 cycles per minute.

5. A method according to claim 1 wherein the step of moving comprises the step of moving the crop along the surface at a speed in the range of between about 0.75 miles per hour to about 6 miles per hour.

6. A method according to claim 1 wherein the step of moving comprises the step of retaining the crop on the surface for at least about one second.

7. A method according to claim 1 wherein the step of subjecting comprises the step of subjecting the crop, while on the surface, to at least about twenty acceleration and deceleration cycles.

8. A method according to claim 7 wherein the step of subjecting comprises the step of subjecting the crop, while on the surface, to at least about forty acceleration and deceleration cycles.

9. A method according claim 1 wherein the step of moving comprises the step of guiding the crop along an approximately circularly arcuate path.

10. A method according to claim 1 wherein the step of subjecting comprises the step of momentarily reversing the movement of the crop on the surface during each cycle.

11. A method according to claim 1 including the step of biasing the crop towards the surface.

12. A method for harvesting seed crop having kernels carried by plant growth, the method comprising the steps of providing a support surface for the crop having perforations of a sufficient size to permit kernels to pass therethrough; providing a plurality of members spaced from and movable relative to the surface; moving the crop onto the surface; engaging the crop on the surface with the members; moving the members and therewith the crop relative to the surface at a substantially constant speed in a downstream direction; with members alternatingly accelerating and decelerating the crop on the surface substantially parallel to the downstream direction to thereby induce the separation of the kernels from the plant growth; collecting kernels which pass through the perforations; and collecting the plant growth, including some loose kernels, after they have passed the surface.

13. A method according to claim 12 wherein the members comprise elongated tines, wherein the surface has an approximately semi-cylindrical shape, and wherein the steps of moving the members and accelerating and decelerating them comprises the step of rotationally moving the members at a cyclically varying speed about an axis which is substantially concentric with an axis of the approximately semi-cylindrical surface.

14. A method according to claim 12 including the step of yieldingly resisting movement of the crop over the surface to thereby enhance the kernel separating action of the vibrating members.

15. A method according to claim 12 including the step of maintaining a minimum spacing between the members and the surface of about one-fourth inch.

16. A method according to claim 12 wherein the step of collecting the plant growth and some loose kernels includes the step of facilitating the segregation of loose kernels from the plant growth by subjecting them to a series of accelerations and decelerations in an approximately horizontal direction so that the kernels move gravitationally downward relative to the plant growth, and including the step of collecting kernels which become segregated from the plant growth during the facilitating step.

17. A method for harvesting a seed crop having kernels carried by plant growth with a combine adapted to move about a seed crop field, the method comprising the steps of gathering the seed crop; directing the crop onto a concave, perforated surface defining an axis and having perforations permitting the passage of kernels therethrough; engaging the crop on the surface with a multiplicity of elongated, spaced apart tines having free ends which are spaced from the surface; with the tines moving the crop across the surface in a downstream direction by rotating the tines about an axis substantially concentric with the axis of the surface at a speed about equal to the speed with which the combine moves about the field; while moving the tines subjecting them to angular accelerations and decelerations about the axis of rotation at a frequency of at least about 300 cycles per minute to thereby sepatate the kernels from the plant growth; yieldingly resisting the downstream movement of the crop over the surface to facilitate the kernel separation from the plant growth as a result of the tine cyclical accelerations and decelerations; receiving the plant growth, including some loose kernels, downstream of the surface; subjecting the plant growth, including some loose kernels, to vibratory oscillations in an approximately horizontal direction to enable the loose kernels to gravitationally move relative to the plant growth until they are separated therefrom; and collecting kernels passing through the surface perforations and freed from the plant growth for subsequent use.

18. A method according to claim 17 wherein the step of yieldingly resisting comprises the step of positioning a multiplicity of spaced apart islands on the surface, the islands being raised relative to the surface and spaced apart in directions parallel and perpendicular to the downstream direction.

19. A method according to claim 18 including the step of biasing the seed crop towards the surface.

20. A method according to claim 19 wherein the steps of moving the tines and subjecting them to accelerations and decelerations comprise the step of cyclically moving the tines a first, predetermined distance in a downstream direction and a second, lesser distance in an upstream direction so that during the movement of the seed crop over the surface, it is subjected to a multiplicity of reversals in its direction of movement to thereby subject the kernels to acceleration and deceleration forces which cause their separation from the plant growth.

21. A method according to claim 17 wherein the seed crop is selected from the group consisting of wheat, barely, oats, safflower, sudan grass seed, alfalfa seed, dry beans, rice, wild rice, corn, milo, soy bean, sorghum and black-eyed peas.

22. A method for harvesting a seed crop having kernels carried by plant growth, the method comprising the steps of moving the seed crop in a downstream direction; repeatedly subjecting the crop to oppositely acting inertial forces acting substantially parallel to the downstream direction and of a sufficient magnitude to separate the kernels from the plant growth; and segregating the kernels from the plant growth.

23. A method for harvesting seed crop having kernels carried by plant growth, the method comprising the steps of providing a support surface of the crop having perforations of a sufficient size to permit kernels to pass therethrough; moving the crop relative to the surface at a substantially constant speed in a downstream direction; while on the surface repeatedly subjecting the crop to oppositely acting inertial forces acting generally parallel to the downstream direction and of a magnitude sufficient to thereby effect the separation of the kernels from the plant growth; collecting kernels which pass through the perforations; and collecting the plant growth, including some loose kernels, after they have passed the surface.

24. A seed crop harvester for harvesting a seed crop having kernels carried by plant growth, the apparatus comprising a frame; a thresher carried by the frame including means defining a surface over which the seed crop can be moved in a downstream direction and vibrating means adapted to engage the seed crop on the surface and move it in a downstream direction at a predetermined average speed while subjecting the crop on the surface to cyclical accelerations and decelerations acting substantially parallel to oppositely acting the downstream direction and of a sufficient frequency and amplitude to cause the separation of the kernels from the plant growth; and means for segregating separated kernels from the plant growth.

25. Apparatus according to claim 24 wherein the frame is adapted to move about a seed crop field, and wherein the vibrating means includes means for moving the plant growth over the surface in a downstream direction at an average speed approximately equal to the speed of the frame about the field.

26. Apparatus according to claim 24 wherein the vibrating means includes means for subjecting the crop on the surface to between about 300 to 3,000 acceleration and deceleration cycles per minute.

27. Apparatus according to claim 25 wherein the vibrating means includes the means for subjecting the crop on the surface to at least about twenty acceleration and deceleration cycles.

28. Apparatus according to claim 24 wherein the surface defining means and the vibrating means are constructed and cooperate for maintaining contact between the seed crop and the surface for at least about one second.

29. Apparatus according to claim 24 wherein the vibrating means including means for moving the seed crop across the surface at a speed in the range of between about one mile per hour to about six miles per hour.

30. Apparatus according to claim 24 wherein the surface defining means includes means cooperating with the vibrating means for yieldingly resisting the downstream movement of the seed crop across the surface.

31. Apparatus according to claim 24 wherein the surface defining means comprises a perforated plate having a multiplicity of openings distributed thereover and of a sufficient size to permit loose kernels to pass therethrough.

32. Apparatus according to claim 31 wherein the vibrating means includes a multiplicity of elongated tines having free ends proximate to and spaced from the surface.

33. Apparatus according to claim 32 wherein the plate is trough-shaped.

34. Apparatus according to claim 33 including hub means for mounting the tines so that the tines project generally radially therefrom, the hub means being generally coaxial with the trough-shaped plate, and means for imparting rotational motion to the hub means, and thereby to the tines, for moving the seed crop in the downstream direction over the plate and for subjecting the crop to the cyclical accelerations and decelerations.

35. Apparatus according to claim 34 wherein the tines are arranged over the length of the hub means in discrete, spaced apart radial planes, and including means attached to the plate and positioned intermediate the radial planes for yieldingly resisting the downstream movement of the seed crop over the plate.

36. Apparatus according to claim 35 wherein the yieldingly resisting means comprises a multiplicity of members arranged intermediate the radial planes in which the tines are mounted, the members being further spaced apart from each other in the downstream direction and extending from the surface towards the axis beyond the free ends of the tines; whereby the tines are permitted to freely pass the members while the members engage and yieldingly resist the downstream movement of the seed crop moving over the plate.

37. Apparatus according to claim 36 wherein edges of the members located above the plate are rounded.

38. Apparatus according to claim 37 wherein the members are constructed and arranged so that there is an average clearance between the members and the tines of at least about ⅛ inch.

39. Apparatus according to claim 38 wherein a spacing between the tine ends and the plate is at least ¼ inch, and wherein the members extend above the plate by at least about ½ inch.

40. Apparatus according to claim 39 wherein the tines are constructed of a fiber reinforced resin, are cylindrical and have a diameter of at least about ½ inch.

41. Apparatus according to claim 40 wherein the members are constructed of a high molecular weight polyethylene, and including means for removably securing the members to the perforated plate.

42. Apparatus according to claim 24 wherein the vibrating means comprises a multiplicity of elongated, spaced apart tines and means mounting the tines so that free ends of the tines are proximate to and spaced from the surface and the tines are generally transversely oriented relative to the surface, first drive means, including a power driven rotating first drive shaft operatively coupled to the tine mounting means for moving the free tine ends across the surface at the predetermined, substantially constant speed, and second drive means operatively coupled with the tine mounting means for subjecting the tines to cyclical accelerations and decelerations at a rate of at least about 300 cycles per minute.

43. Apparatus according to claim 42 wherein the second drive means is constructed to momentarily move the free tine ends in an upstream direction during each acceleration and deceleration cycle.

44. Apparatus according to claim 43 wherein the second drive means is constructed so that the free tine ends move during each cycle at least about twice as far in the downstream direction as they move in the upstream direction.

45. Apparatus according to claim 24 including means carried by the frame for biasing the seed crop towards the suface.

46. Apparatus according to claim 42 wherein the first drive means includes a first motor for driving the first drive shaft, and coupling means cooperatively associated with the first drive shaft for effectively isolating the first motor from cyclical acceleration and deceleration motions of the tine mounting means to prevent damage to the first motor therefrom.

47. Apparatus according to claim 24 including means downstream of the surface and adapted to receive plant growth and loose kernels which have passed the surface for segregating loose kernels from the plant growth.

48. Apparatus according to claim 47 wherein the segragating means comprises means subjecting the plant growth and loose kernels to oscillating motions in a primarily horizontal direction so that as a result of such motions loose kernels can gravitationally move through the plant growth and thereby work themselves free of the plant growth for their subsequent collection.

49. Apparatus for harvesting a seed crop. having kernels carried by plant growth, the apparatus comprising a mobile frame including means for moving the frame about a seed crop field at a given travel speed; a trough-shaped screen having a multiplicity of openings through which kernels can pass; a crop moving and vibrating mechanism including hub means substantially coaxially rotatable relative to the screen and a multiplicity of crop engaging first members projecting from the hub means towards the screen and being spaced from the screen; first drive means for rotating the hub means so that the first members move relative to the screen at a speed which is on the order of about the travel speed; second drive means for subjecting the hub means and therewith the first members to a multiplicity of cyclical accelerations and decelerations as any given members moves along the screen; and segregating means downstream of the screen, adapted to receive plant growth and lose kernels suspended in the growth from the screen and including means for subjecting the plant growth and loose kernels to relative motions to segregate the loose kernels from the plant growth; whereby seed crop entering the screen is moved towards the segregating means at cyclically varying rates of speed which causes the separation of the kernels from the plant growth and loose kernels can be collected for subsequent use beneath the screen and beneath the segregating means.

50. Apparatus according to claim 49 wherein the members comprise elongated tines having free ends which ar spaced at least about ¼ inch from the screen.

51. Apparatus according to claim 50 wherein the tines are arranged in a plurality of spaced apart, radial planes arranged over at least a portion of the length of the hub means, and including a multiplicity of second members attached to the screen, projecting from the screen towards the hub means and past the free ends of the tines, arranged in spaces between the radial planes of the tines so that the tines can pass the second members, the second members being further circumferentially spaced apart and having generally rounded corners so that the second members yielding resist movement of the seed crop by the tines over the screen to enhance the separation of the kernels from the plant growth.

52. Apparatus according to claim 51 including elongated straps of a flexible material disposed in the spaces between the radial planes for the tines, each strap having a first end fixed relative to the frame, a second, free end movably supported by the frame and a configuration so that the straps are biased towards the screen, whereby seed crop moving over the screen is held by the straps against the screen to prevent plant growth from wrapping about the rotating hub means.

53. Apparatus according to claim 51 wherein the second members have a height, in the direction from the screen towards the hub means which exceeds the spacing between the free tine ends and the screen by a factor of at least about two, and an elongated shape, the second member having long sides which extend in the direction of rotation of the tines relative to the screen.

54. Apparatus according to claim 49 wherein the segregating means comprises a second, trough-shaped screen, second hub means coaxially rotatable relative to the second screen, a multiplicity of elongated tines carried by and projecting outwardly from the second hub means, and third drive means operatively coupled with the second hub means for moving the second hub means and therewith the tines projecting therefrom at cyclically varying speeds to accelerate and decelerate the plant growth and kernels disposed on the second screen and thereby facilitate the gravitational downward movement of loose kernels through the plant growth onto and past the second screen.

55. Apparatus according to claim 54 wherein the axes of the first and second screens are parallel to each other.

56. Apparatus according to claim 55 wherein the axes of the first and second screens are generally perpendicular to the direction of movement of the frame about the field.

57. Apparatus for harvesting a seed crop having kernels carried by plant growth, the apparatus comprising:
 a frame including means for moving the frame about a seed crop field;
 a concave, approximately semi-cylindrically shaped screen having openings through which kernels can pass and including a multiplicity of members, the members projecting a given distance generally radially inwardly from the screen and being arranged in a plurality of axially spaced, circumferentially arranged rows so that opposing sides of the members of adjacent rows define between them unobstructed paths which extend circumferentially from an upstream end to a downstream end of the screen;
 a vibrator carried by the frame and defined by a hub which is coaxilly rotatable relative to the screen and a multiplicity of elongated tines projecting from the hub and having free ends which are spaced from the screen less than the given distance, the tines having a width less than the spacing between opposing sides of members in adjacent rows and being further arranged on the hub so that the tines move along the unobstructed paths when the hub rotates;
 first variable speed drive means operatively coupled with the hub for rotating the hub at a speed selectable to be on the order of the speed of the frame about the field and rotationally moving the tines from the upstream end to the downstream end of the screen;
 second drive means operatively coupled with the hub for cylically varying the rotational speed of the hub a multiplicity of times as any given tine moves from the upstream end to the downstream end of the screen, the second drive means being adjustable so that the cyclical rotational speed variations result in cyclical accelerations and decelerations of the tines which, when imparted to the seed crop carried on the screen, causes a separation of the kernels from the plant growth;
 a plurality of elongated, flexible seed crop hold-down straps for biasing the seed crop on the screen towards the screen, each hold-down strap having a first end fixed relative to the frame, extending about a portion of the hub in close proximity of the screen and a second end which is movable relative to the frame in the direction of the strap length, the straps being disposed over portions of the screen outside the unobstructed paths, whereby the straps permit the passage over the screen of seed crop accumulations of varying heights while at all times biasing the plant growth towards the screen and preventing it from wrapping about the rotating hub;
 shaker means downstream of the screen for receiving plant growth and loose kernels discharged from the screen, and for causing the loose kernels to move downwardly relative to the plant growth until segregated therefrom; and
 means for collecting kernels separated from the plant growth.

58. Apparatus for harvesting a seed crop having kernels carried by plant growth, the apparatus comprising a mobile frame including means for moving the frame about a seed crop field; a screen carried by the frame having a multiplicity of openings through which kernels can pass; a mechanism adapted to engage the crop on the screen at relatively spaced apart points substantailly evenly distributed over the screen for moving the crop in a downstream direction over the screen and for subjecting the crop while on the screen to inertial forces acting substantially parallel to the downstream direction and of a magnitude sufficient to cause the kernels to separate from the plant growth; means for segregating loose kernels from the plant growth.

59. A method for harvesting a seed crop having kernels carried by plant growth, the method comprising the steps of moving seed crop in a downstream direction over a surface; while on the surface repeatedly reversing the direction of movement of the crop parallel to the downstream direction to thereby subject the crop to inertial forces of a sufficient magnitude to separate the kernels from the plant growth; and segregating the kernels from the plant growth.

60. A method for harvesting a seed crop having kernels carried by plant growth, the method comprising the steps of moving the seed crop in a downstream direction; separating the kernels from the plant growth solely by means of repeatedly subjecting the crop to oppositely acting inertial forces acting substantially parallel to the downstream direction and of a sufficient magnitude to effect the separation of the kernels from the plant growth; and segregating the kernels from the plant growth.

61. A method for harvesting a seed crop having kernels carried by plant growth, the method comprising the steps of forming a layer of the seed crop; moving the layer of the seed crop in a downstream direction with a plurality of spaced apart rods in contact with the layer; subjecting the rods and thereby the crop layer engaged by them to cyclical accelerations and decelerations acting substantially parallel to the downstream direction and of a sufficient magnitude and frequency to separate the kernels from the plant growth; and segregating the kernels from the plant growth.

* * * * *